Nov. 10, 1953   C. I. MacNEIL   2,659,044
ELECTRICAL APPARATUS
Filed April 28, 1949   4 Sheets-Sheet 1

Inventor
Charles I. MacNeil.
By Herbert L. Davis, Jr.
Attorney

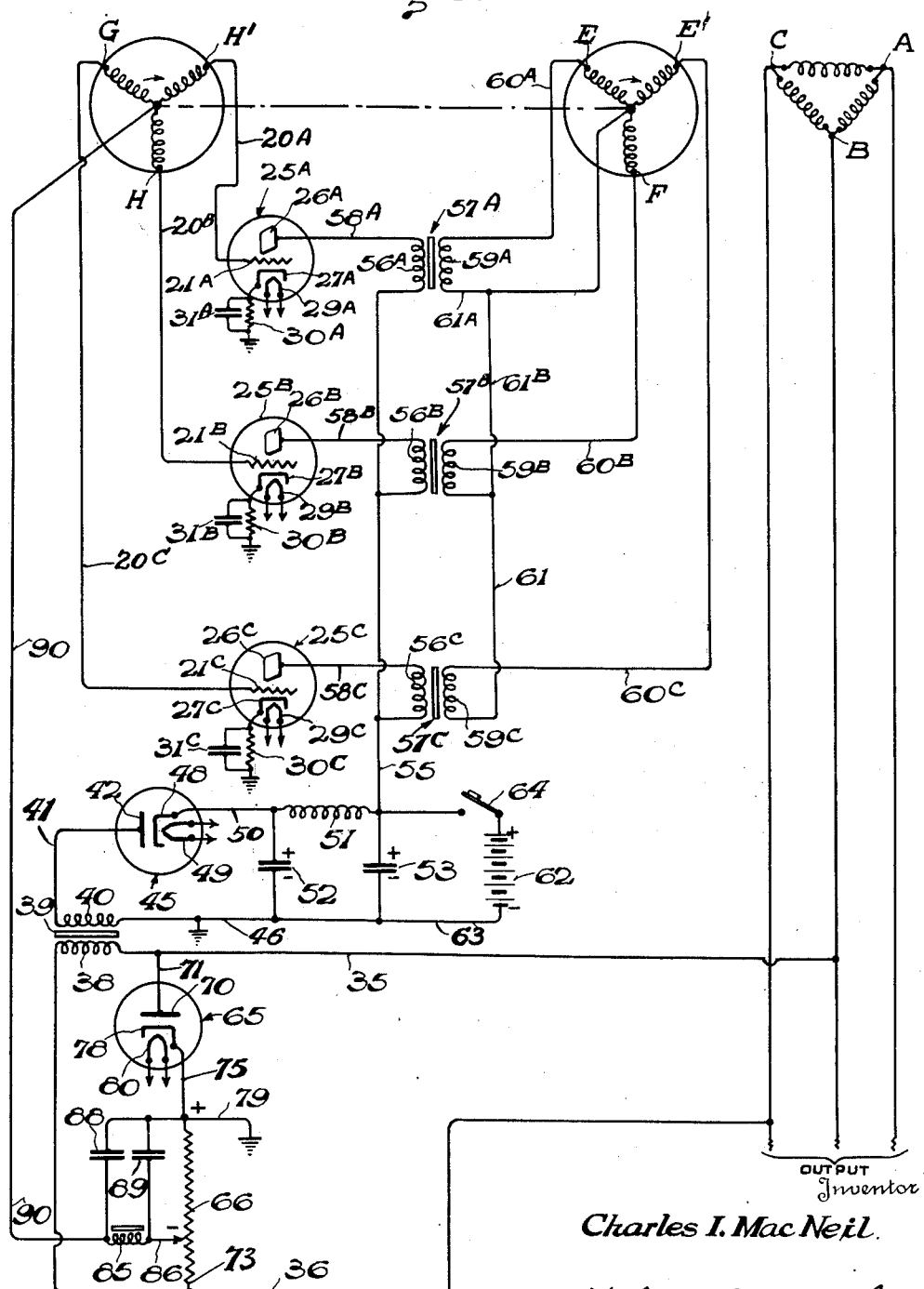

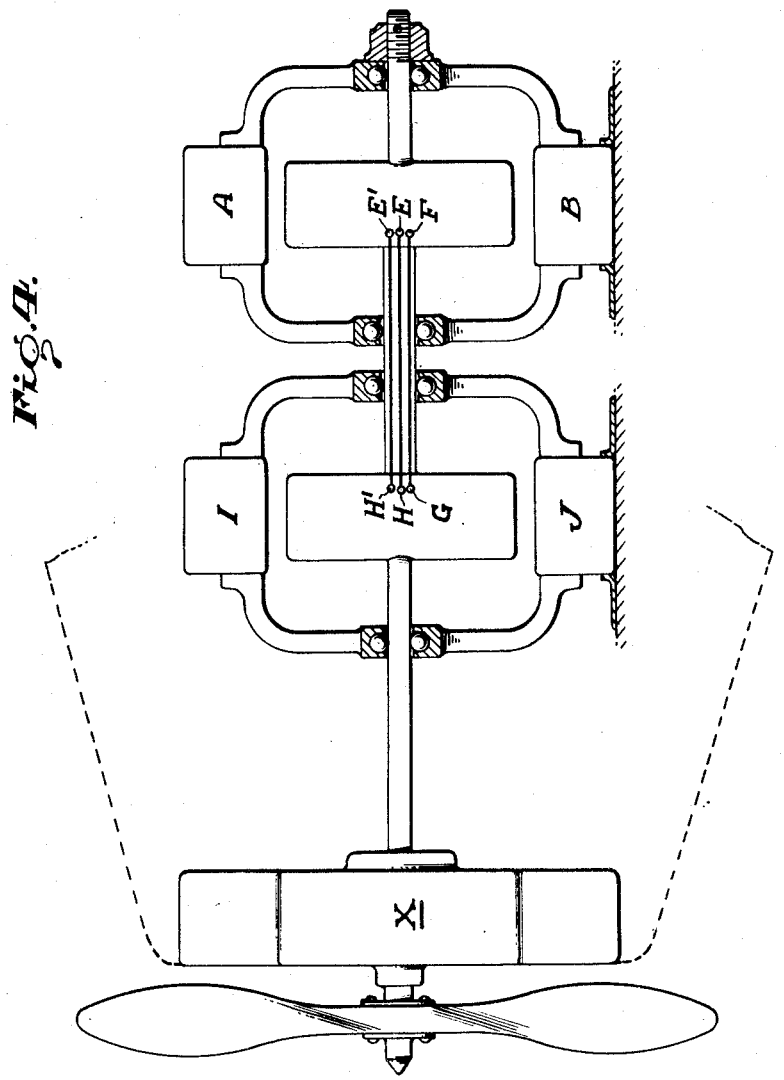

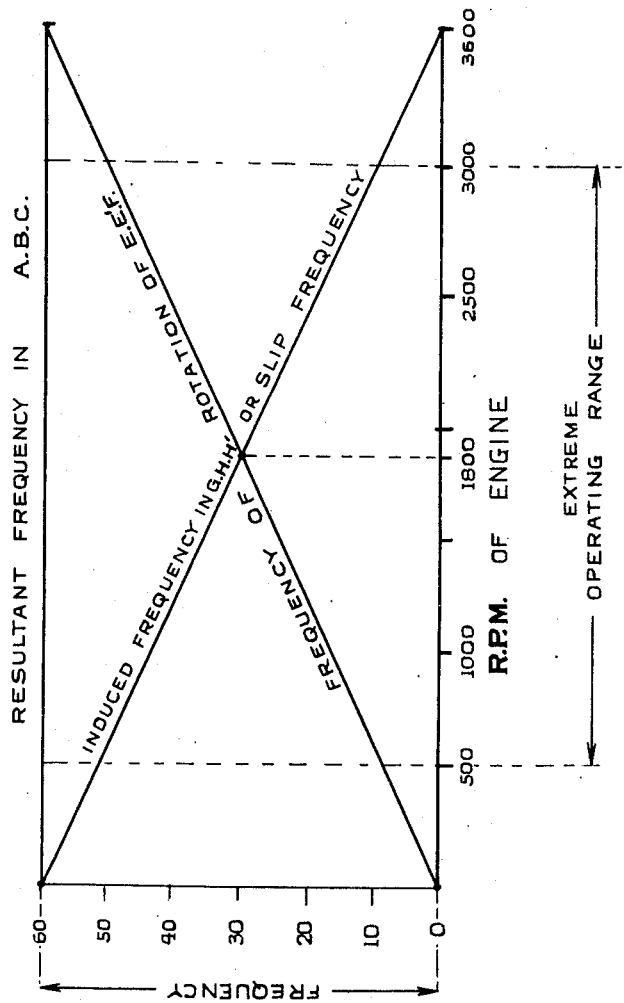

Patented Nov. 10, 1953

2,659,044

UNITED STATES PATENT OFFICE 2,659,044

ELECTRICAL APPARATUS

Charles I. MacNeil, Shada, Cap Haitien, Haiti, West Indies, assignor to Bendix Aviation Corporation, Teterboro, N. J., a corporation of Delaware Application April 28, 1949, Serial No. 90,217

9 Claims. (Cl. 322—24)

The present application is a continuation in part of my copending application Serial No. 489,675, filed June 4, 1943, now abandoned, as to all matter common to the two applications.

This invention relates to electrical apparatus, and more particularly to the control of the frequency and voltage output of an alternating current circuit.

An object of the invention is to control the alternating frequency of current generated in a machine which is mechanically driven from a variable speed prime mover.

Another object is to provide a novel method of maintaining constant frequency in a circuit supplied from a variable speed source.

Another object is to provide novel means for interrelating two electrical machines operating at different speeds—one constant, the other varying—in such a manner as to secure constant frequency output from the variable speed machine, and without regard to the relative capacities of the two machines.

Another object of the invention is to provide novel means for maintaining a substantially constant voltage output from a dynamoelectric machine operating at varying driven speeds.

Another object of the invention is to provide a novel electronic voltage regulator.

Another object of the invention is to provide a novel electronic voltage regulator, including a diode and resistor connected across an energizing circuit for the field of a generator and arranged so as to regulate the excitation of the field so as to maintain a substantially constant voltage output from the generator.

Another object of the invention is to provide a novel amplifier circuit for the field of a generator.

Another object of the invention is to provide a novel means for initiating operation of the amplifier circuit.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Figure 3 is a diagram illustrating the amplifier and regulator circuit for Figure 2;

Figure 4 is a diagrammatic view illustrating the manner in which the windings EF and GH are driven;

Figure 5 is a graphical illustration of the operating range of the device of the present invention.

Figure 1:
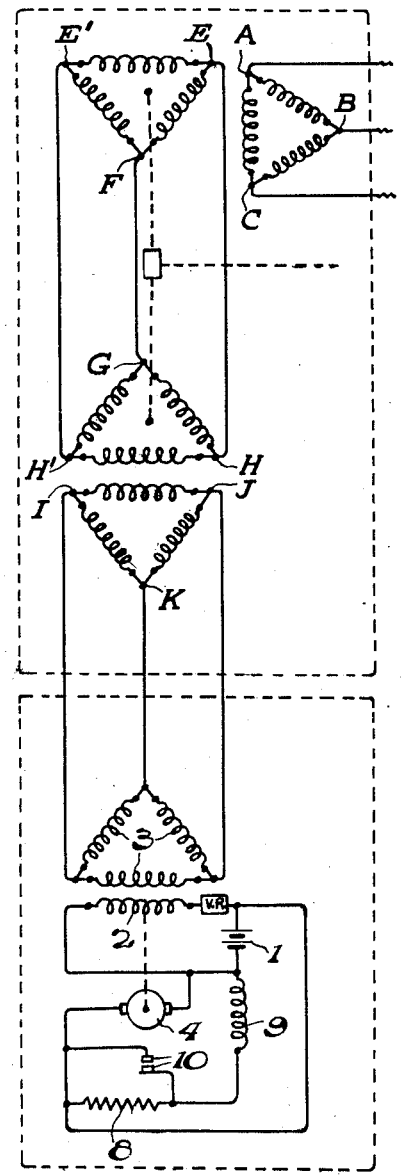
Figure 1 is a schematic diagram illustrating one embodiment of the invention.
Figure 2:
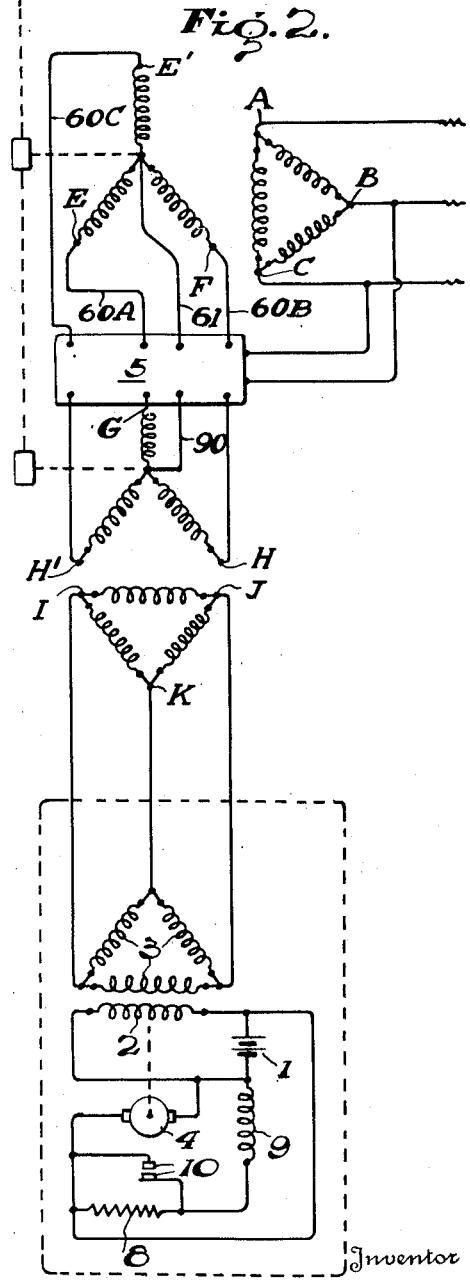
Figure 2 is a diagram illustrating the preferred embodiment.

In both Figures 1 and 2, reference numerals A, B, C, E, E', F designate a mechanically driven, variable speed induction generator. A, B and C are polyphase armature or generator windings of the stator of this main generator. E, E', F is the rotor or polyphase field windings of the main generator. G, H, H' is the rotor or polyphase armature windings of a dynamo-electric machine having the structure of a wound-rotor induction motor. I, J, K are the stator or polyphase field windings of this dynamo-electric machine which is used herein as a generator of variable frequency A. C. power. The rotors E, E', F and G, H, H' are mechanically connected so as to operate at the same speed as shown in Figure 4 and may be driven by a prime mover such as a variable speed, aircraft engine or other suitable power means.

The numeral 3 indicates armature windings of polyphase generator whose field winding 2 is excitable by a D. C. source 1. The unit 2—3 operates at constant speed and delivers constant frequency power. The unit is mechanically driven by a constant speed motor 4 of any suitable form. As shown, motor 4 is also energized from source 1. The object is to control the frequency circuit A, B, C.

A resistance 8 is shown as included in the shunt field 9 of motor 4, until such time as contacts 10 close to remove such resistance. The motor 4 and the generator 2—3 will ordinarily be of much smaller capacity than the power plant-driven generator A, B, C, E, E', F, its purpose being only that of providing a reference frequency.

Operation: (Fig. 1) the constant frequency power of a frequency $f$, supplied by 3, excites stator windings I, J, K. The winding G, H, H' is rotated in relation to the windings I, J, K in such direction to the rotating field (magnetic) set up by virtue of the polyphase energization of windings I, J, K, that there is induced in the windings G, H, H' currents having a frequency equal to $f$ minus the frequency equivalent to the physical speed of G, H, H'. Thus, if the physical speed of rotation equals zero, frequency in G, H, H' equals $f$; if physical speed of rotation of G, H, H' is the desired synchronous speed, frequency in G, H, H' equals zero and if the physical speed be less than synchronous speed there will be induced in the winding G, H, H' a current having a frequency equal to $f$ minus the frequency of the speed of rotation of winding G, H, H'.

As the frequency of G, H, H' is used to excite E, E', F, it follows that if the physical speed of E, E', F is zero the frequency in A, B, C is equal to $f$ under which conditions the induced voltage in the windings of A, B, C will have the same frequency as that in generator windings 3. Moreover, if the frequency of G, H, H' (or E, E', F) is ½ $f$ and physical speed of G, H, H' (E, E', F) is ½ synchronous speed of $f$, the frequency A, B, C will equal $f$.

In other words, if the frequency of the current induced in G, H, H', (E, E', F) is less than $f$, then the physical speed of E, E', F under which this condition occurs, will be correspondingly less than standard, and the frequency of the induced current in A, B, C will be increased by the latter speed of rotation over the frequency of the current in E, E', F by the amount of the deviation, due to the compensating frequency of the current induced in G, H, H' upon E, E', F. Hence, with the exception hereinafter noted, regardless of physical speed of E, E', F within the limits of operation and capacity of the equipment, the frequency of A, B, C equals that of the governing frequency 3, and there results a constant frequency system, regardless of variations in speed of the prime mover. However, when the physical speed of E, E', F and G, H, H' equals the synchronous speed of 3 or the standard, there will be no voltage generated in G, H, H' and hence, no current flow in E, E', F. The frequency of the standard is so arranged as to be sufficiently greater than the speed of rotation of the prime mover for driving the winding E, E', F and G, H, H' that the possibility of the one being in synchronism with the other during operation is so remote as to be of no practical importance.

The generator A, B, C, E, E', F is so arranged that the driven speed of the winding E', E, F will be less than the frequency of the constant frequency unit 2—3 under all normal operating conditions. A typical illustration of the operating range of the device is shown graphically in Figure 5.

Figure 2: The operation of Figure 2 is the same as for Figure 1, except that a voltage-controlled electronic device 5 is inserted in the circuit so that the magnitude of excitation of windings E, E', F is independent of voltage induced in G, H, H' by the winding I, J, K but the frequency of excitation of A, B, C remains a function of the frequency generated in winding G, H, H'.

In the latter arrangement, the voltage from the rotor winding G, H, H' feeds into an amplifier circuit as shown in Figure 3. Ends of the rotor windings G, H, H' are connected through electrical conductors 20A, 20B and 20C to grids 21A, 21B and 21C of amplifier tubes 25A, 25B and 25C respectively. The amplifier tubes 25A, 25B and 25C have respectively plates 26A, 26B and 26C, cathodes 27A, 27B and 27C and filaments or heaters 29A, 29B and 29C energized through a suitable electrical circuit.

The cathodes 27A, 27B and 27C are grounded through resistors 30A, 30B and 30C which are shunted by capacitors 31A, 31B and 31C respectively to maintain a proper D. C. bias on the respective cathodes.

Electrical energy for the plate circuit of the amplifier is taken during normal operation of the generator A, B, C, E, E', F from one of the phases of the generator circuits A, B, C. In this case electrical conductors 35 and 36 lead from the winding B, C to a primary winding 38 of a transformer 39. The transformer 39 has a secondary winding 40 one terminal of which is connected through a conductor 41 to a plate 42 of a suitable rectifier tube 45. The opposite terminal of the secondary winding 40 is grounded through a conductor 46.

The rectifier tube 45 has a cathode 48 and a filament or heater 49 energized through a suitable electrical circuit. A conductor 50 leads from the cathode 48 to a suitable filter including the inductance 51 and condensers 52 and 53 having plates connected respectively at opposite ends of the inductance 51 and the opposite plates grounded through the conductor 46. Thus one output terminal of the filter is connected through its ground connection to the cathodes of the amplifier 25A, 25B and 25C while the other terminal is connected through a conductor 55 to one terminal of a primary winding 56A, 56B and 56C of transformers 57A, 57B and 57C. The opposite terminal of the windings 56A, 56B and 56C are connected through conductors 58A, 58B and 58C to the plates of the respective tubes 25A, 25B and 25C.

The transformers 57A, 57B and 57C have secondary windings 59A, 59B and 59C respectively the terminals of which are connected through conductors 60A, 60B and 60C and 61A, 61B and 61C to opposite terminals of the winding E, E' and F respectively.

In order to initially energize the plate circuit of the amplifier tubes 25, there is provided a battery 62 or other suitable source of electrical energy. The negative terminal of the battery 62 is connected by a conductor 63 to the conductor 46, while the positive terminal is connected through a switch 64 to the conductor 55. The switch 64 may thus be momentarily closed by the operator to effect energization of the plate circuit upon initiating the operation of the system. After the system has been placed in operation the switch 64 may be opened and the voltage across winding B, C of the generator will suffice for energizing the plate circuit through rectifier 45.

There is also provided novel means to control the magnitude of the output of the amplifier in such a manner as to tend to hold the voltage across B, C constant. This is accomplished by shunting a diode 65 with a resistor 66 in series across the lines 35 and 36 and phase B, C. The diode 65 has a plate 70 connected by an electrical conductor 71 to the line 35. The resistor 66 has one end connected by an electrical conductor 73 to the line 36. The opposite end of the resistor 66 is connected by an electrical conductor 75 to the cathode 78 of the diode 65. The conductor 75 is grounded by a conductor 79. The diode 65 has a suitable heater 80 energized through a suitable electrical circuit.

It will be seen from the aforenoted arrangement that the current passing through the diode 65 will increase as the voltage of B, C increases and such current will only pass when the plate 70 has a positive charge applied thereto. It also follows that a point near the lower end of the resistor 66 (marked with a negative sign in Figure 3) becomes increasingly negative with regard to ground upon an increase in current through the resistor 66 and diode 65 due to a rise in the voltage of phase B, C, which causes in turn an increase in the voltage drop or fall of potential across the resistor 66.

This negative D. C. potential or voltage is smoothed out by a filter arrangement including an inductance 85 having one end connected by a conductor 86 to the negative end of the resistor 66. The conductor 86 is adjustable on the resistor 66 so as to set the voltage drop as desired. Condensers 88 and 89 have plates connected respectively at opposite ends of the inductance 85, while opposite plates of the condensers 88 and 89 are grounded through conductor 79.

An output line 90 leads from the other end of the inductance 85 to the windings G, H and H' and through the windings G, H and H' to the respective grids 21A, 21B and 21C. The output circuit of the filter is completed through the grounded connection 79 and grounded cathodes 27A, 27B and 27C. The output circuit is thus completed through the grounded connection of the condensers 31A, 31B and 31C and the grounded connections of the cathodes of the amplifier tubes 25A, 25B and 25C.

It will be thus seen that the negative potential or voltage applied to the resistor 66 is smoothed out or filtered by the combination of condensers 88 and 89 and inductance 85 and it is applied to the grid circuit of the amplifier tube 25 so as to increase the negative potential applied to the grids 21A, 21B and 21C as the voltage of phase B, C increases. There is thus provided means for maintaining a substantially constant voltage output at the lines 35 and 36 upon variance in the speed of rotation of the rotor windings E, E', F and G, H, H'. Thus there is provided regulator means for maintaining a substantially constant output at the generator output lines A, B and C.

It will be seen from the foregoing that since the speed of rotation of the windings E, E', F and G, H, H' will, in normal operation, be less than the standard frequency then the current induced in G, H, H' will be of a frequency correspondingly less. The latter induced current will affect the grids 21A, 21B, and 21C so as to cause a pulsating current to flow in the primary windings 56A, 56B and 56C of the transformers 57A, 57B and 57C of a frequency correspondingly less than the standard. Moreover, through the rotation of the winding E, E', F the frequency induced in A, B, C will be increased over the frequency of E, E', F by the amount of the deviation so as to effect a substantially constant frequency at A, B, C equal to the standard.

Although only two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In combination, a generator including polyphase stationary armature windings and a rotating field winding, a dynamo-electric machine including polyphase stationary field windings and a rotating armature winding, means for rotating said rotating field and armature windings at the same speed and in inductive relation to the respective stator windings of said generator and dynamo-electric machine, means for electrically connecting said rotating windings, prime mover means for driving said rotating means at a variable speed, means for energizing the stator windings of said dynamo-electric machine at a constant frequency independent of the speed of rotation of said rotating windings so as to induce through said rotating field windings a constant frequency in the stator windings of said generator upon a change in the driven speed of said rotating windings, and means independent of said frequency energizing means for maintaining a substantially constant output voltage from said generator.

2. In combination, a generator including an armature carrying a polyphase winding element and a polyphase field winding element inductively coupled thereto, means for rotating the field element relative to the armature element, a dynamo-electric machine including a second armature carrying a polyphase winding element and a second polyphase field winding element inductively coupled thereto, means for rotating said second armature element relative to the second field element, means for electrically connecting said rotating polyphase winding elements, means for rotating said rotating elements in unison at a variable speed, means for energizing said dynamo-electric machine at a constant frequency independent of the speed of rotation of said rotating elements so as to induce through said armature polyphase winding elements a constant frequency in the polyphase field winding element of said generator, and means independent of the energization of said dynamo-electric machine for maintaining a predetermined output voltage from said generator.

3. A device of the character described, comprising, in combination, a power frequency transmission lines, a governing constant frequency circuit, a pair of dynamo-electric machines, said machines having wound rotors and wound stators and said rotors rigidly coupled, power means for driving said coupled rotors, means for impressing governing frequency currents on the stator winding of one of said machines independent of the speed of rotation of said coupled rotors, means including one of said wound rotors for generating power frequency currents in the stator winding of the other of said dynamo-electric machines, means electrically connecting the stator winding of the other dynamo-electric machine to the power frequency transmission lines, electrical connections between the windings of the rotors of the dynamo-electric machines so that under varying driven speed conditions of said rigidly coupled rotors there are generated currents in said power frequency transmission lines having a frequency corresponding to that of the governing frequency circuit and means to energize through the electrical connections of said one wound rotor in response to the voltage at said power transmission lines so as to maintain the voltage at said lines substantially constant.

4. The combination defined by claim 3 including an electronic valve in each of said last mentained electrical connections, each of said electronic valves including an anode, cathode and control grid, and means to vary the bias applied to the control grid of each of said electronic valves in proportion to the output voltage across the power frequency transmission lines so as to tend to maintain the voltage at said lines substantially constant.

5. The combination defined by claim 3 including an electronic valve in each of said last mentioned electrical connections, each of said electronic valves including an anode, cathode and control grid, and means including a diode and resistor element connected across at least two of said power transmission lines to vary the bias applied to the control grid of each of said electronic valves in proportion to the output voltage across the power frequency transmission lines so as to tend to maintain the voltage at said lines substantially constant.

6. In combination, a generator including polyphase stator windings and a rotating field winding, a dynamo-electric machine including polyphase stator windings and a rotating armature winding, means for rotating said field and armature windings at the same speed and in inductive relation to the respective stator windings of said generator and dynamo-electric machine, means for electrically connecting said field and armature windings, prime mover means for driving said rotating windings, in unison at a variable speed, means for energizing the stator windings of said dynamo-electric machine at a constant frequency so as to induce through said rotating windings a constant frequency in the stator windings of said generator, and means for energizing the field winding of said generator so as to induce a predetermined voltage in said polyphase stator windings.

7. In combination, a generator including a rotor carrying a three phase winding element and a stator carrying a three phase winding element, said elements inductively coupled, means for rotating said rotor relative to the stator, a dynamo-electric machine including a second rotor carrying a three phase winding element and a second stator carrying a three phase winding element inductively coupled to the second rotor winding element, means for rotating the second rotor of said dynamo-electric machine relative to the second stator, means for electrically connecting the windings of said rotors, means for rotating said rotors in unison at a variable speed, means for energizing the second stator winding element of said dynamo-electric machine at a constant frequency so as to induce through said first mentioned rotor winding element a constant frequency in the polyphase winding element of the stator of said generator, and means to energize the polyphase windings of said generator rotor from the output voltage of the polyphase stator windings of said generator, and other means responsive to the voltage across at least one of said stator winding elements of said generator to regulate said last means so as to tend to maintain a substantially constant output voltage from the polyphase stator winding element of said generator.

8. In combination, a generator including stator and rotor windings, means for rotating the rotor winding relative to the stator winding, and means for energizing said rotor winding at a frequency varying in inverse relation to the speed of rotation of said rotor winding so as to induce a substantially constant frequency in said rotor winding, and other means for energization of the rotor winding in proportion to the output voltage across the stator winding so as to tend to maintain said output voltage substantially constant.

9. In combination, a generator including rotor and stator windings, means for rotating the rotor winding relative to the stator winding, means for energizing said rotor winding at a frequency varying in inverse relation to the speed of rotation of said rotor winding so as to induce a substantially constant frequency in said stator winding, and electronic means to energize said rotor winding in inverse relation to the output of said stator winding to maintain a substantially constant output.

CHARLES I. MacNEIL.

References Cited in the file of this patent

UNITED STATES PATENTS

| Number | Name | Date |
|---|---|---|
| 2,371,056 | Livingston | Mar. 6, 1945 |
| 2,466,560 | Schoenbaum et al. | Apr. 5, 1949 |

FOREIGN PATENTS

| Number | Country | Date |
|---|---|---|
| 644,744 | France | June 18, 1928 |